US007285317B2

(12) United States Patent
Biagiotti et al.

(10) Patent No.: US 7,285,317 B2
(45) Date of Patent: Oct. 23, 2007

(54) METHOD AND DEVICE FOR PRODUCING AN EMBOSSED WEB MATERIAL AND PRODUCT OBTAINED WITH SAID METHOD

(75) Inventors: Guglielmo Biagiotti, Lucca (IT); Angelo Benvenuti, Lucca (IT)

(73) Assignee: Fabio Perini, S.p.A., Lucca (IT)

( * ) Notice: Subject to any disclaimer, the term of this patent is extended or adjusted under 35 U.S.C. 154(b) by 83 days.

(21) Appl. No.: 10/508,511

(22) PCT Filed: Mar. 24, 2003

(86) PCT No.: PCT/IT03/00173

§ 371 (c)(1), (2), (4) Date: Sep. 21, 2004

(87) PCT Pub. No.: WO03/082559

PCT Pub. Date: Oct. 9, 2003

(65) Prior Publication Data

US 2005/0170145 A1 Aug. 4, 2005

(30) Foreign Application Priority Data

Mar. 29, 2002 (IT) ............................ FI2002A0053

(51) Int. Cl.
*B32B 3/00* (2006.01)
*B29C 59/04* (2006.01)
*B29C 65/00* (2006.01)

(52) U.S. Cl. ...................... 428/166; 428/154; 428/172; 425/194; 425/363; 156/209; 156/292

(58) Field of Classification Search ................ 428/156, 428/166, 172, 154; 156/207, 209, 292; 162/109, 162/113; 425/195, 363, 367, 471, 194
See application file for complete search history.

(56) References Cited

U.S. PATENT DOCUMENTS

| | | | |
|---|---|---|---|
| 3,414,459 | A | 12/1968 | Wells |
| 3,694,300 | A | 9/1972 | Small |
| 3,961,119 | A | 6/1976 | Thomas |

(Continued)

FOREIGN PATENT DOCUMENTS

| | | |
|---|---|---|
| BR | 1 225 440 | 3/1971 |

(Continued)

*Primary Examiner*—Donald J. Loney
(74) *Attorney, Agent, or Firm*—Breiner & Breiner, LLC

(57) ABSTRACT

A method for producing an embossed web product comprising at least two plies (V1, V3) bone to one another by gluing, wherein: at least a first of said plies is embossed producing on it a first series of protuberances (P9) and a second series of protuberances (P10), the protuberances of the first series being of greater height than the protuberances of the second series; an adhesive (C) is applied to the protuberances of said first series; the first ply is glued to the second ply (V3), the protuberances (P9, P10) of the first ply projecting inside the web product, towards the second ply (V3). The protuberances of the first and of the second series form in combination with each other complex decorative patterns (D). Each complex decorative pattern is formed by at least a protuberance of the first series and at least a protuberance of the second series. Moreover, the complex decorative patterns are distributed with a density equal to or less than 2 patterns per $cm^2$.

31 Claims, 5 Drawing Sheets

U.S. PATENT DOCUMENTS

| | | | |
|---|---|---|---|
| 4,320,162 | A | 3/1982 | Schulz |
| 4,978,565 | A | 12/1990 | Pigneul et al. |
| 5,096,527 | A | 3/1992 | Biagiotti |
| 5,173,351 | A | 12/1992 | Ruppel et al. |
| 6,106,928 | A | 8/2000 | Laurent et al. |
| 6,136,413 | A | 10/2000 | Le Port et al. |
| 2003/0021953 | A1 | 1/2003 | Graff |

FOREIGN PATENT DOCUMENTS

| | | | |
|---|---|---|---|
| EP | 0 738 588 | A1 | 10/1996 |
| EP | 0 765 215 | B1 | 3/1999 |
| EP | 0 797 705 | B1 | 12/1999 |
| EP | 0 876 537 | B1 | 9/2001 |
| FR | 2 602 999 | | 2/1988 |
| WO | WO 96/32248 | | 10/1996 |
| WO | WO 97/20687 | | 6/1997 |
| WO | WO 97/20688 | | 6/1997 |
| WO | WO 97/20689 | | 6/1997 |
| WO | WO 99/44814 | | 9/1999 |
| WO | WO 00/78533 | A1 | 12/2000 |

1P
1

1
V1
3
11
N
9
13

15
15R
C
9p
10
5P
5
5

7
V3

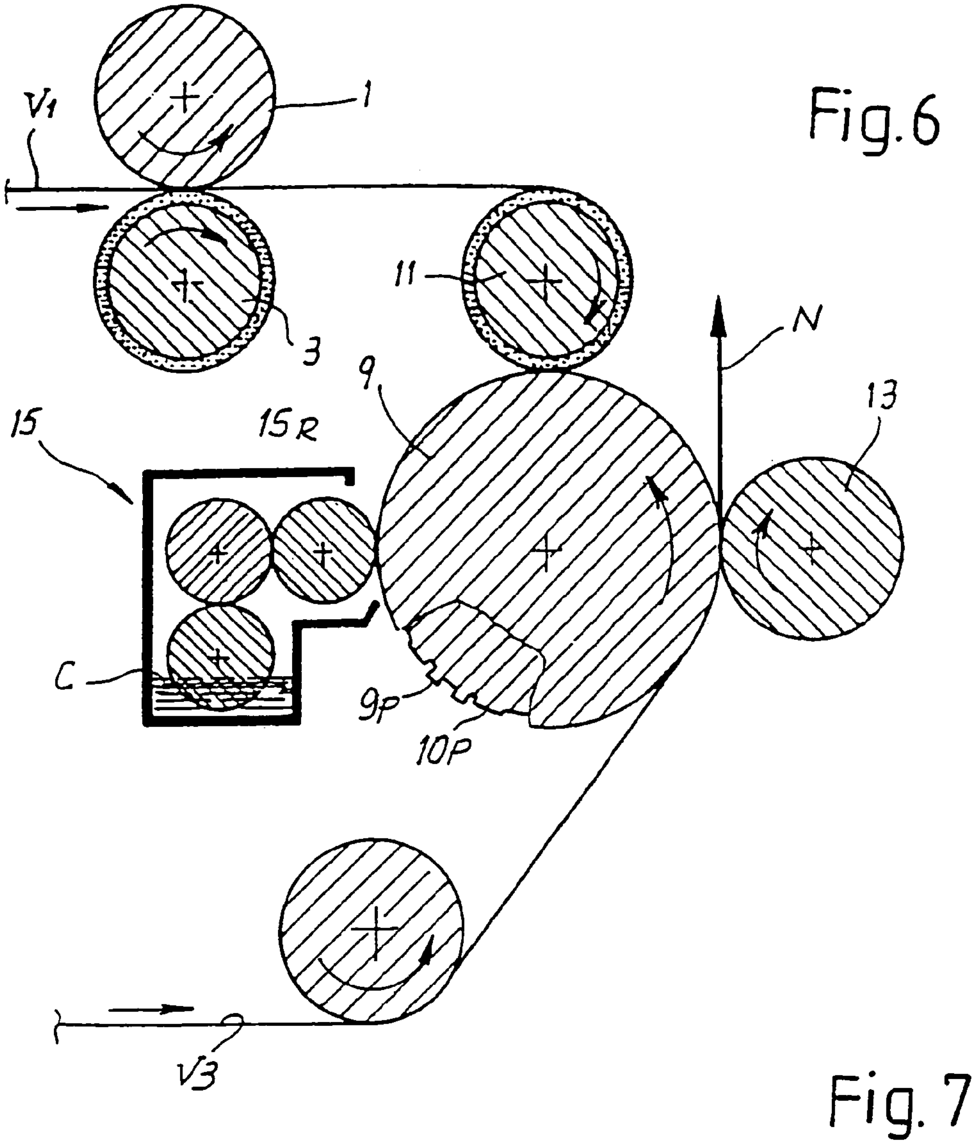
Fig. 6
Fig. 7
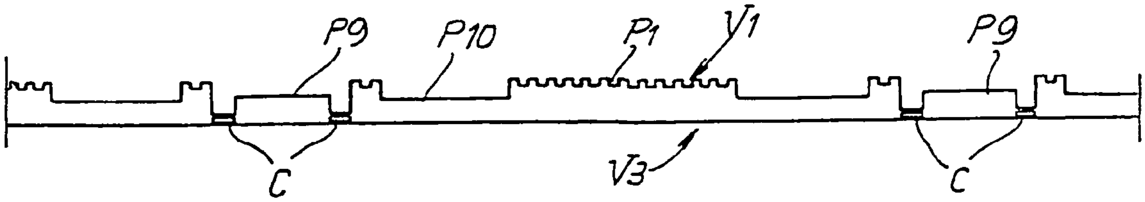
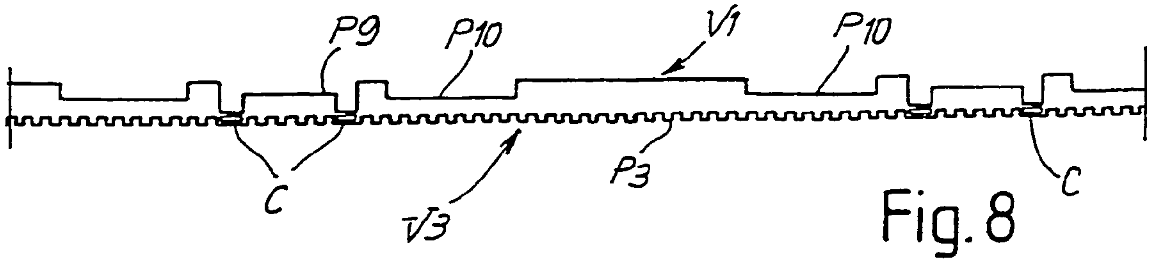
Fig. 8

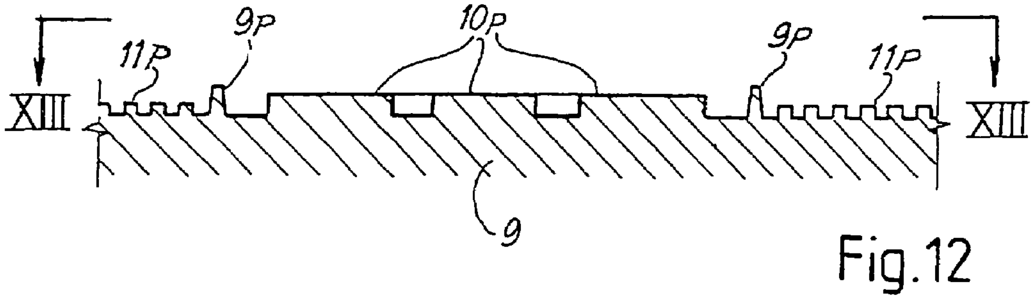
Fig.12
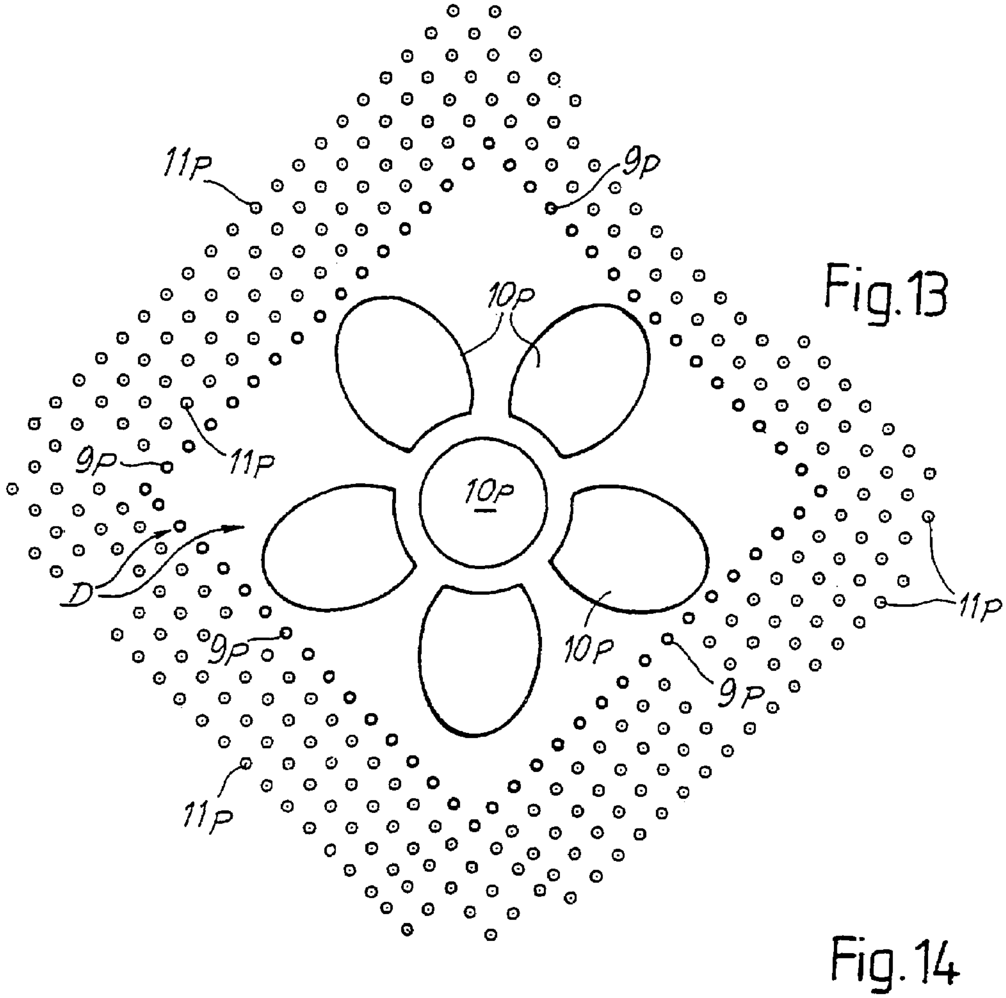
Fig.13
Fig.14
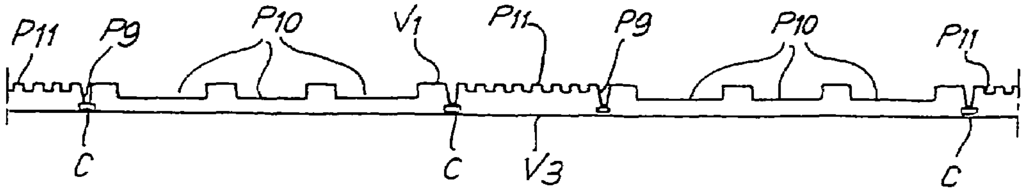

METHOD AND DEVICE FOR PRODUCING AN EMBOSSED WEB MATERIAL AND PRODUCT OBTAINED WITH SAID METHOD

TECHNICAL FIELD

The present invention relates to a method and a device for producing embossed web material, of the type comprising two or more embossed plies bonded to one another by gluing.

The present invention also relates to an embossed laminate product constituted by two or more plies bonded to one another by gluing.

STATE OF THE ART

In the manufacture of paper sheet products for domestic and similar uses, a paper web material is frequently embossed to obtain a sheet which is apparently thicker, has good characteristics of fluid absorbency, tactile characteristics of softness and a decorative effect.

The embossed sheet web material is used to produce kitchen paper, toilet tissue, paper napkins, paper handkerchiefs and the like. In general, this web material is constituted by two or more plies of tissue paper with a weight ranging for example from 10 to 50 g per $m^2$, which are usually embossed separately from one another and subsequently bonded, usually by means of an adhesive. In this way particularly soft and thick laminate products, with high fluid absorbency characteristics, are obtained.

Two or more plies are normally embossed and bonded according to two methods, known respectively as "tip-to-tip" and "nested" embossing. In the first case two plies of embossed material are bonded by lamination between two axially parallel and counter-rotating embossing cylinders. The two rollers are provided with points which correspond at least partially with each other in a lamination nip defined in the tangent point between the two rollers. An adhesive is applied to the protuberances of one of the two embossed ply to obtain stable bonding with the other ply in correspondence with the protuberances of the other ply in the zones in which the points of the two embossing cylinders coincide with each other. Examples of embossing devices of this type are described in U.S. Pat. No. 3,414,459, U.S. Pat. No. 4,978,565, U.S. Pat. No. 5,173,351, U.S. Pat. No. 5,096,527, U.S. Pat. No. 3,961,119, WO-A-9720687, WO-A-9720688, WO-A-9720689.

In other devices, the plies are bonded so that the protuberances of one ply nest in correspondence with the cavities between the adjacent protuberances of the other ply. In this case the two embossing cylinders are not pressed against each other in correspondence with the relative points and the two plies are bonded to each other by lamination through a pressure roller which cooperates with the surface of one of the embossing cylinders, on which both plies fed from the nip between the embossing cylinders are positioned.

Examples of this type of embossing are described and illustrated in GB-A-1,225,440 and U.S. Pat. No. 3,694,300.

Normally embossing, whether tip-to-tip or nested, is constituted by a geometrical and uniform distribution of protuberances typically with a frusto-conical or frusto-pyramidal shape on the two plies. To obtain a product of greater aesthetic prestige, systems have been designed in which protuberances of various shapes are combined with one another to obtain a particular decoration. For example, U.S. Pat. No. 4,320,162 describes an embossing system in which embossing is produced on each of the two plies constituted by uniform and geometrical distribution of small protuberances positioned with a high density, forming fine background embossing, combined with a low density distribution of protuberances of complex shape and of larger size, forming a decorative pattern.

WO-A-9944814 and WO-A-0078533 describe embossing methods and devices with different configurations, with which it is possible to obtain particularly appreciable aesthetic effects and which offer some advantages in terms of production flexibility.

EP-B-0797705 (corresponding to WO-A-9618771) describes an embossed product constituted by two sheets of tissue paper embossed with designs substantially identical to each other, each formed by a background geometrical pattern, constituted by an extremely dense distribution of small protuberances, and by a less dense distribution of protuberances of larger size and complex form, forming a decorative pattern. The decorative pattern is higher than the background geometrical pattern and an adhesive is applied to the protuberances of which it is formed.

WO-A-9727365 describes an embossed paper product constituted by two plies bonded together by gluing. The first ply is provided with an embossing design constituted exclusively by a distribution of small protuberances, with a high density and forming a background geometrical pattern, while the second ply is decorated with a design constituted exclusively by protuberances of large size forming decorative designs.

WO-A-9535205 describes a method for producing an embossed web product comprising two plies bonded to each other by gluing, wherein:

a first ply is embossed creating on it a first series of protuberances and a second series of protuberances, the protuberances of the first series being of greater height than the protuberances of the second series;

an adhesive is applied to the protuberances of said first series;

the first ply is bonded to the second ply.

In the embossed product formed in this way the protuberances of the second ply nest between the protuberances of the first ply in a "nested" configuration. The protuberances of the first series form designs or complex decorative patterns, while the protuberances of the second series form a uniform geometrical distribution of a high density of points with a simple shape.

The different height of the protuberances produced on the first ply makes it possible to reduce the total quantity of adhesive applied to the web product. The design or complex decorative pattern, constituted by the protuberances of the first series, provides an extremely appreciable aesthetic effect on the finished product, especially if surrounded by a background constituted by the smaller protuberances of the second series.

In the context of the present description and the attached claims, the first and second series of protuberances may be intended as protuberances separate from each other, but also alternatively or in combination protuberances of different heights bonded to each other, that is forming a single body. In other words, the concept underlying the invention also includes a method in which the complex decorative patterns are formed by one or more projections each formed by at least two portions of different height. In this case the two or more portions of different heights forming the projections constitute the protuberances of the first and of the second series respectively.

This method of decorating tissue paper products, to produce toilet tissue, paper napkins or other analogous products, has become extremely widespread, but is limited by the fact that the designs or decorative patterns must have a density and surface area (and therefore a form) which cannot be varied freely, but must comply with limits imposed by the characteristics of the product. In particular, they must be sufficiently dense to permit effective bonding by gluing between the two plies, without however requiring excessive distribution of adhesive, or a concentration of adhesive in zones spaced far apart from one another. For example, it is not possible to produce designs or decorative patterns with protuberances with front surfaces having large transverse or longitudinal sizes, as this would cause excessive stiffness in the product due to the concentration of adhesive on the surface.

U.S. Pat. No. 5,173,351 describes another method for producing an embossed web product, in which the protuberances of one of the plies are of different heights to reduce the quantity of adhesive applied.

FR-A-2602999 describes a tip-to-tip procedure, in which colored adhesive is applied to all the protuberances of one of the two plies, to obtain a decorative effect similar to a print. A colored adhesive is also suggested in GB-A-1225440, to obtain analogous effects. In this case, the adhesive is applied to all the protuberances geometrically distributed on the ply. An analogous technique is described in WO-A-9632248 where, in order to reduce the adhesive applied and to obtain particular decorative effects, a shaped gluing cylinder is used, which distributes colored adhesive in zones, so that the geometrical protuberances produced by embossing on one of the two plies are only partly colored and glued to the corresponding protuberances of the opposed ply.

OBJECTS AND SUMMARY OF THE INVENTION

The object of the present invention is to produce a method and a device for producing an embossed web material, which makes it possible to obtain particular aesthetic effects unobtainable with traditional methods and devices, maintaining or improving the technical characteristics of the product and eliminating or reducing the limits to the shapes and extensions of complex decorative patterns, imposed by technical requirements for suitable and gauged adhesive distribution.

The object of the present invention is also to produce an embossed sheet product which has high fluid absorbency capacities, is very soft and has particular aesthetic and decorative effects.

These and other objects and advantages, which will be evident to those skilled in the art by reading the text below, are substantially obtained with a method wherein one of the two plies to be bonded is provided with a first series of protuberances of greater height, to which the adhesive is applied, and a second series of protuberances of lesser height, and wherein the protuberances of the first and of the second series in combination form complex decorative patterns, each complex decorative pattern being formed by at least a protuberance of the first series and at least a protuberance of the second series, and wherein said complex decorative patterns are distributed with a density equal to or less than 2 patterns per $cm^2$. The complex decorative patterns may thus be produced with much greater freedom, as it is not necessary for the entire embossed surface in correspondence with said patterns to the provided with adhesive. On the contrary, being formed by protuberances of at least two different heights, adhesive may be applied to a variable surface of each complex decorative pattern independent of the size and form of this pattern.

According to a particularly advantageous embodiment of the method according to the invention, the adhesive is colored and thus provides the complex decorative pattern with a chromatic effect which increases the overall aesthetic effect of the pattern.

In this way a particularly soft product is obtained, which employs a limited quantity of adhesive, thus maintaining a high degree of softness and flexibility. At the same time, the combined use of embossed protuberances of different heights and possibly of the color contained in the adhesive makes it possible to obtain aesthetic and decorative effects unobtainable with currently known methods, with a much greater versatility in producing the decorations.

The two plies which are thus bonded may be smooth, with the exception of the protuberances which form the complex decorative pattern on one of the two plies. Alternatively, the two plies may also each be provided with an equal distribution of protuberances, and these may be bonded with a tip-to-tip configuration.

According to a different embodiment of the method of the present invention, one or other or both of the plies may be provided with a background pattern or texture, for example extremely dense embossing of reduced size, that is micro-embossing. Alternatively, the background texture or pattern may be obtained, instead of with embossing (that is mechanical deformation of the ply or plies), directly during manufacture of the ply, adopting—in a per se known way—a forming fabric provided with a suitable texture, for example formed with a very coarse fabric. In this case the ply is provided with a surface texture which reproduces in reverse the texture of the fabric with which the forming fabric is made. When background embossing is to be obtained, this may be produced on the ply together with the protuberances which form the complex decorative pattern, in a single embossing operation, even with a single embossing cylinder. Alternatively, as shall be illustrated with reference to one embodiment, it is possible to perform two embossing operations in sequence on the same ply.

For reasons of simplicity and reduction of system costs, as well as to avoid problems of timing, on the other hand, the protuberances of the first and of the second series (which in combination form the complex decorative patterns) are preferably produced with a single procedure, that is with points of different heights produced on the same cylinder.

The protuberances of the background embossing are preferably smaller in height than the protuberances of the second series, that is the protuberances of lesser height which form the complex decorative pattern. Different solutions are not excluded, in which the background embossing has the same height as the protuberances of the second series or even an intermediate height between the height of the protuberances of the second series and the height of the protuberances of the first series, The decorative patterns constituted by the combination of the protuberances of the first and of the second series of protuberances produced on the first ply may be distributed with a density ranging from 400 to 20000 patterns per $m^2$. Moreover, the protuberances of the second series (that is the protuberances of greater height) may occupy a percentage ranging from 0.3 to 10% of the total surface of the web product. In this way on the one hand sufficient reciprocal adhesion of the plies is guaranteed and on the other the quantity of adhesive per unit of surface of the web material is limited. The decorative patterns constituted by the combination of the protuberances of the first and of the second series occupy a percentage ranging from 1 to 25% of the total surface of the product.

The invention also relates to a sheet product, comprising:

a first embossed ply with a first series of protuberances and a second series of protuberances, the protuberances of the first series being of greater height than the protuberances of the second series;

a second ply glued to said first ply by an adhesive applied to the extremities of the first series of protuberances, said protuberances facing towards the second ply.

Characteristically, according to the invention, the protuberances of the first and of the second series form in combination with each other complex decorative patterns, each complex decorative pattern being formed by at least one protuberance of the first series and at least one protuberance of the second series. Moreover, the complex decorative patterns are distributed with a density equal to or lower than 2 patterns per $cm^2$.

According to a particularly advantageous embodiment of the invention, the adhesive is colored and provides said complex decorative pattern with a chromatic effect.

In general, the second ply may be smooth, or decorated with a decorative pattern analogous to the one on the first ply, with tip-to-tip bonding, or provided with a background pattern, for example dense embossing or even embossing with geometrical patterns of larger size, possibly with smooth zones in correspondence with the decorative patterns of the first ply. In a particularly advantageous embodiment of the invention, one or other of, or preferably both the plies are provided with background micro-embossing, that is with a more or less geometrical background texture, constituted by fine embossing or by a texture produced on the ply or plies during manufacture in the continuous machine which produces the plies from the fiber and water mix.

Further advantageous characteristics and embodiments of the method and product according to the invention are indicated in the attached claims.

BRIEF DESCRIPTION OF THE DRAWINGS

The finding shall now be better understood following the description and attached drawing, which shows some non-limiting practical embodiments of the invention. In greater detail, in the drawing:

FIG. 6 shows an analogous view to the one in FIG. 1 of a second embodiment of the device according to the invention;

FIG. 7 shows an analogous section to the one in FIG. 3, of a product obtained with the device in FIG. 6;

FIG. 8 shows an analogous section to the one in FIGS. 3 and 7, of a product in a variant of embodiment;

FIG. 12 shows a local section of an embossing cylinder provided with points in a different embodiment;

FIG. 13 shows a schematic and enlarged section of a product obtained with a cylinder configured according to FIG. 12; and FIG. 14 shows atop view of FIG. 14.

DETAILED DESCRIPTION OF THE PREFERRED EMBODIMENTS OF THE INVENTION

Figures 1, 1A, 1B:
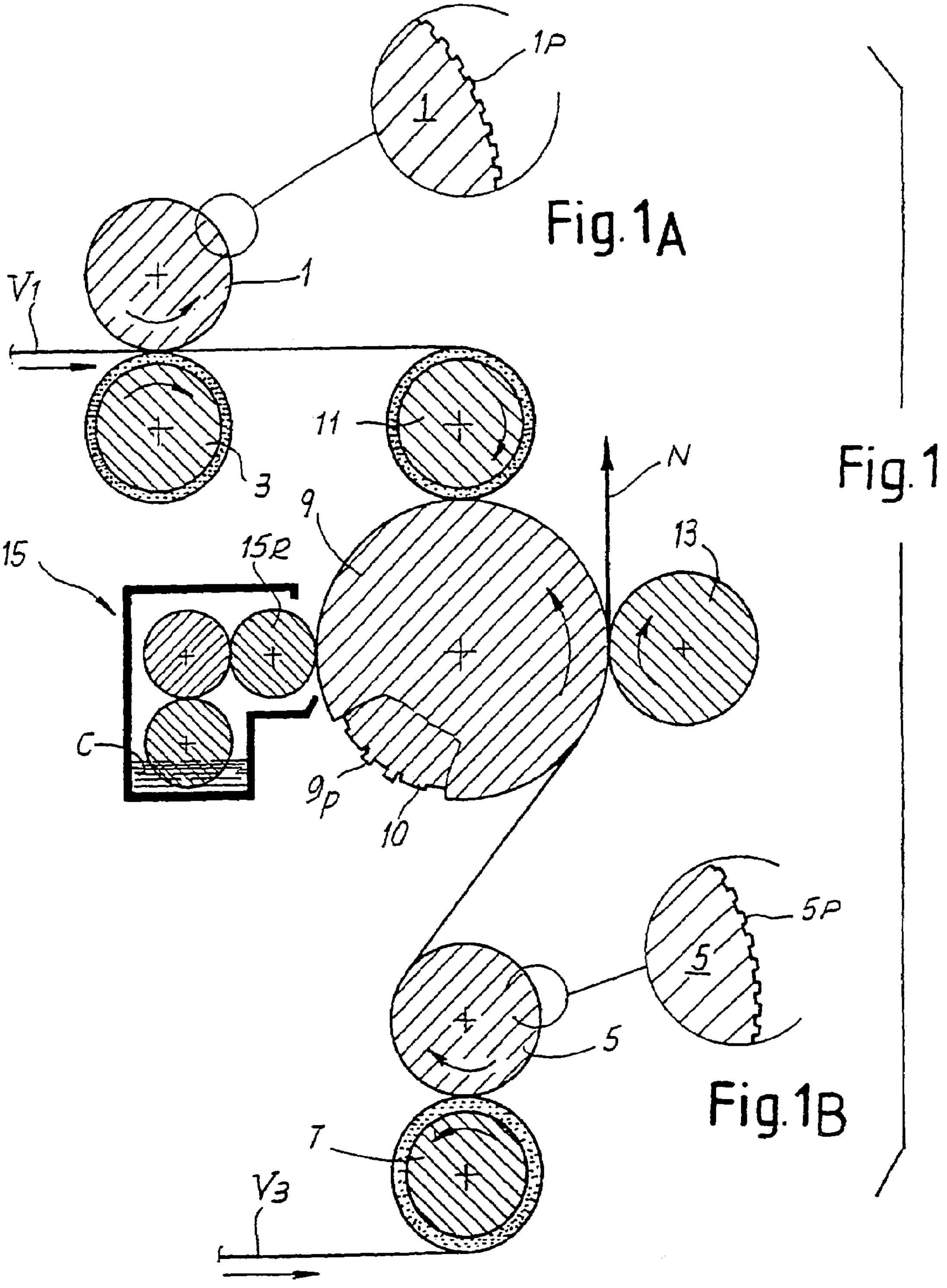
FIG. 1 shows a diagrammatical side view of a device according to the invention in a first embodiment.
FIGS. 1A and 1B show enlarged details of FIG. 1.

With initial reference to FIG. 1, according to a first embodiment of the invention, a device is provided which has a first embossing unit for a first ply V1, comprising a pair of embossing rollers 1, 3, the first of which is a steel roller provided with a plurality of points 1P (see detail in FIG. 1A). The second roller 3 is a roller coated with a yielding and elastic material, such as rubber.

Moreover, the device has an embossing unit for a second ply V3, comprising a pair of embossing rollers 5, 7 the first of which is a steel roller provided with points 5P analogous (although not necessarily equal) to the points 1P of the roller 1, while the second is a roller coated in a yielding material.

Alternatively, one or both of the embossing units 1, 3 and 5, 7 may have two steel rollers, provided with points and recesses, in a per se known way.

The points of the rollers 1 and 5 are of simple geometrical shape, for example a truncated conical or a truncated pyramidal shape, and are positioned with a density ranging from 10 to 200 points per $cm^2$, and preferably greater than 30 points per $cm^2$. They produce embossing or micro-embossing forming a background design on the plies V1 and V3 of web material which are made to pass through the pairs of rollers 1, 3 and 5, 7. The height of the points 1P and 5P may advantageously range from 0.2 to 1 mm and their front surfaces may advantageously range from 0.1 and 1 $mm^2$.

The device comprises, moreover, a second embossing unit for the first ply V1, constituted by an embossing cylinder 9 provided with a plurality of points 9P, 10P of a larger size, with a more complex form compared to the points of the rollers 1 and 5 and distributed with a substantially lower density than the points 1P, 5P.

Figure 2:
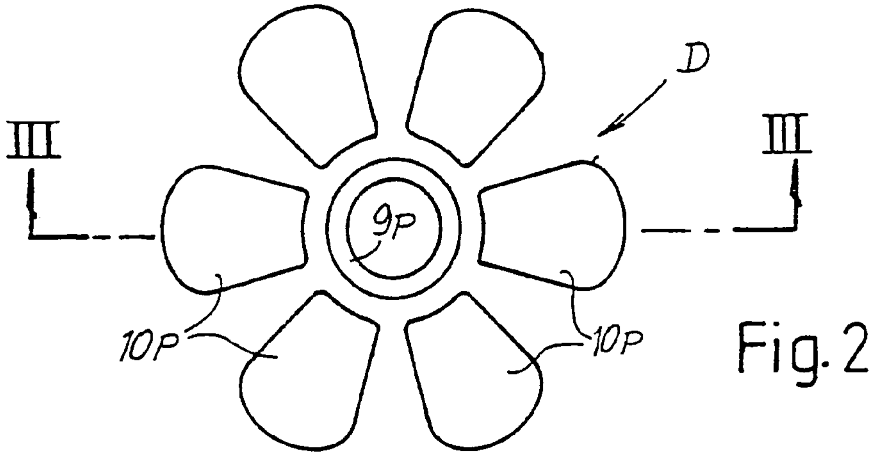
FIG. 2 shows a front view of a portion of the embossing cylinder provided with the points which produce the decorative pattern on the product.
Figure 3:
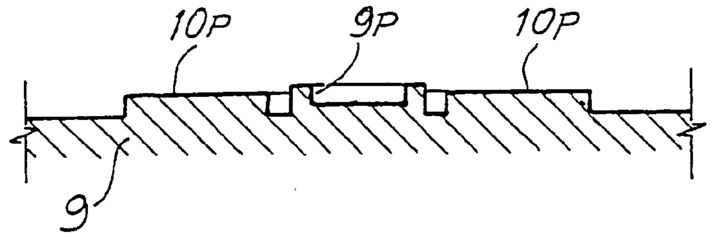
FIG. 3 shows a local section according to III-III in FIG. 2.

Characteristically, according to the invention, the embossing cylinder 9 is provided with at least two series of points. The points of the first series, indicated with 9P are of greater height than the points of the second series, indicated with 10P. Advantageously, the points 9P and 10P are combined with each other to form complex decorative patterns, as illustrated as an example in FIGS. 2 and 3, which show a front and sectional view of one of these patterns. In the example, the decorative pattern, indicated as a whole with D, represents a flower with a center formed by a point of greater height 9P surrounded by petals formed by points 10P of lesser height. The different heights of the points 9P and 10P are reflected in the product in a variable height of the decorative or ornamental pattern impressed by embossing on the ply V1. The difference between the heights of the points 9P and 10P may range from 0.2 to 1 mm.

A pressure roller 11 coated with yielding material, such as rubber, and a marrying roller 13 which may be made of hard material, such as steel, of moderately yielding material, such as hard rubber, or of elastically yielding material like the roller 3, cooperate with the embossing cylinder 9. An adhesive applicator 15, of the type per se known, with a gluing roller 15R, is also provided. The gluing roller 15R receives the adhesive from rollers upstream which draw it from a tank, or with any other known system, and distribute it on the extremities of the protuberances of the ply V1 impressed in it by the points 9P of greater height of the embossing cylinder 9 when the ply V1 passes between the embossing cylinder 9 and the pressure roller 11. On the other hand, as the extremities of the protuberances produced in the ply V1 by the points 10P of lesser height do not come into contact with the surface of the gluing roller 15R, they do not receive any adhesive.

The adhesive C may advantageously be colored, to obtain the desired chromatic decorative effect, which is added to the decorative effect of embossing.

The device described operates in the following way. The two plies V1 and V3 are each fed to the respective first embossing unit 1, 3 and 5, 7 and undergo initial background embossing by the points 1P of the roller 1 and by the equivalent points 5P of the roller 5 (see detail in FIG. 1B), which produce on each ply a respective first series of protuberances P1 and P3 (see FIG. 4).

Downstream of the pair of rollers 1, 3 the ply V1 is fed to the second embossing unit 9, 11 and for this purpose is driven around the pressure roller 11 and then around the embossing cylinder 9. The pressure with which the pressure roller 11 presses against the surface of the embossing cylinder 9 causes a second embossing of the ply V1, with a lower density pattern, constituted by the points 9P, 10P, which have a different height from each other but in any case greater than the points 1P and 5P.

Figure 4:
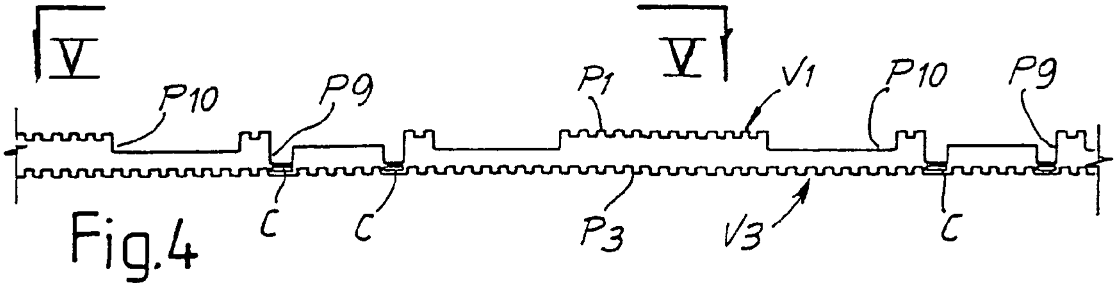
FIG. 4 shows a greatly enlarged and schematized transverse section of a sheet product obtained with the device in FIG. 1.
Figure 5:
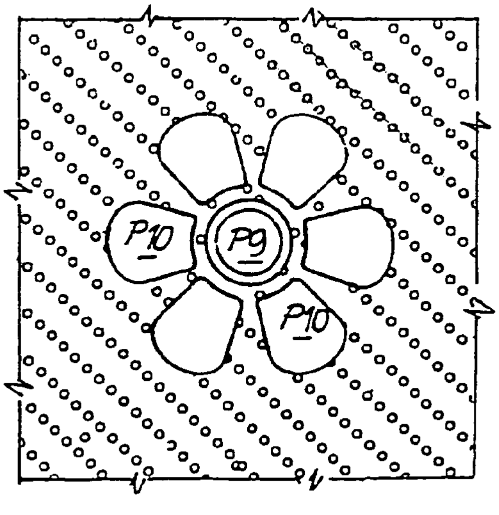
FIG. 5 shows a front view according to V-V of a portion of the product in FIG. 4.

As can be seen in FIGS. 4 and 5, the ply V1 is thus provided with a decorative or ornamental pattern formed by the protuberances P9 and P10 in correspondence with the points 9P and 10P respectively. The protuberances P9 are thus of greater height than the protuberances P10.

The ply V3, embossed by the respective first embossing unit 5, 7 is driven around the embossing cylinder 9, where it is made to rest against the ply V1 previously provided with colored adhesive by the adhesive applicator 15 on the most protruding surface of the ply, that is in correspondence with the protuberances P9.

The two plies V1 and V3 resting on the surface of the embossing cylinder 9 are then laminated between the embossing cylinder 9 and the marrying roller 13 so as to cause reciprocal adhesion and obtain the final web material N. In the lamination zone embossing of the ply V3 positioned in correspondence with the points 9P of the embossing cylinder 9 is practically cancelled by the effect of compression. The ply V3 is thus substantially flat in correspondence with the protuberances P9. If (as in the example illustrated) the laminating roller 13 is relatively hard, the ply V3 is simply flattened in correspondence with the points 9P, 10P, while if the roller 13 is coated in yielding material, the ply V3 is embossed in correspondence with the points 9P, 10P, receiving a design equal to the one produced on the ply V1.

The web material N which is obtained (see FIGS. 4 and 5) will be characterized by a ply (V3) provided with micro-embossing constituted by a dense distribution of geometrical protuberances P3, and by a ply (V1) provided with background micro-embossing substantially analogous to the micro-embossing of the ply V3 and formed by the protuberances P1, and with ornamental embossing formed by decorative patterns constituted by all the protuberances P9 and P10. All the protuberances project towards the inside of the product N. The protuberances P9 are (in the example illustrated) colored by the effect of the colored adhesive C which has been applied to them. These protuberances are also the only zones provided with adhesive and guarantee reciprocal bonding of the two plies V1, V3.

In the illustrated example the decorative pattern takes the shape of a flower, although this is only one possible example of the infinite possible decorations which may be produced by combining protuberances of two or more different heights. The center of the flower, formed by the protuberance P9, may be colored for example yellow with the adhesive, while the petals formed by the protuberances P10 will remain the same background color as the ply V1, for example white.

FIG. 6 shows a modified embodiment of the system. Equal numbers indicate parts equal or corresponding to those of the system in FIG. 1. The embodiment in FIG. 6 differs from the embodiment in FIG. 1 due to the absence of the embossing unit 5, 7. Therefore, the ply V3 does not undergo micro-embossing. The web product obtained with this system is schematically illustrated in the section of FIG. 7, where the ply V3 is smooth. It is understood that instead of being smooth, the ply V3 may also be provided with a processing effect obtained for example during the manufacturing phase of the ply, with the use of a forming wire or mesh provided with a particular surface conformation.

Alternatively, by eliminating or removing from the process the embossing unit 1, 3 and using the embossing unit 5, 7, a web product is obtained of the type schematically illustrated in section in FIG. 8, where the ply V1 is provided only with the decorative or ornamental pattern, formed by all the protuberances P9, P10, the former of which are colored by the effect of the adhesive; while the ply V3 is provided with background micro-embossing.

Alternatively, it is possible to eliminate or remove from the process both embossing units 1, 3 and 5, 7. In this case the two plies V1 and V3 will have no background embossing or micro-embossing and only the ply V1 will be provided with a decorative pattern obtained by embossing and partially colored by the adhesive. Alternatively, one or both the plies V1, V3 may be provided with a background design, or texture, produced in a different way to embossing, for example by a forming wire with a suitable surface structure, according to a technique known to those skilled in the art.

Figure 9:
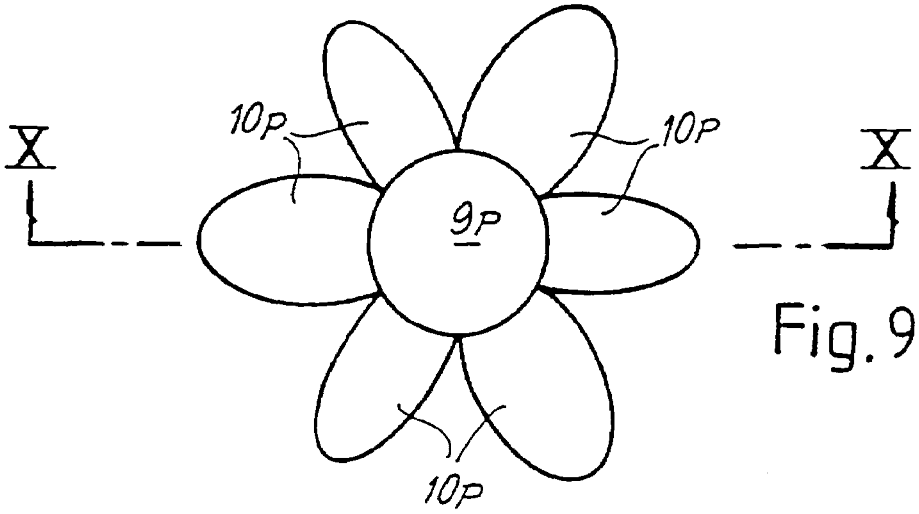
FIG. 9 shows a front view of a portion of the embossing cylinder with points producing a decorative pattern or design in a different embodiment.
Figure 10:
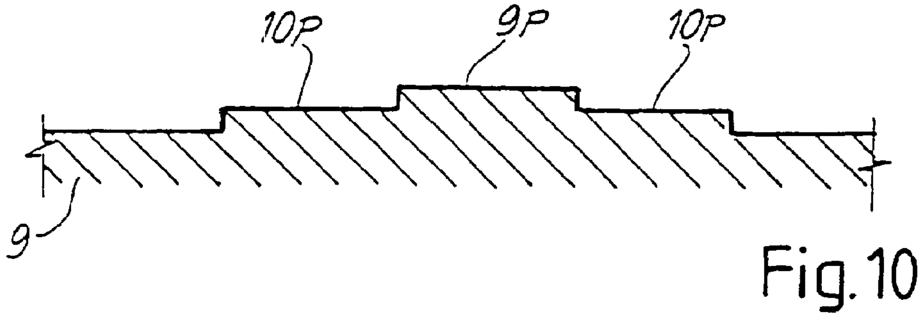
FIG. 10 shows a section according to X-X in FIG. 9.
Figure 11:
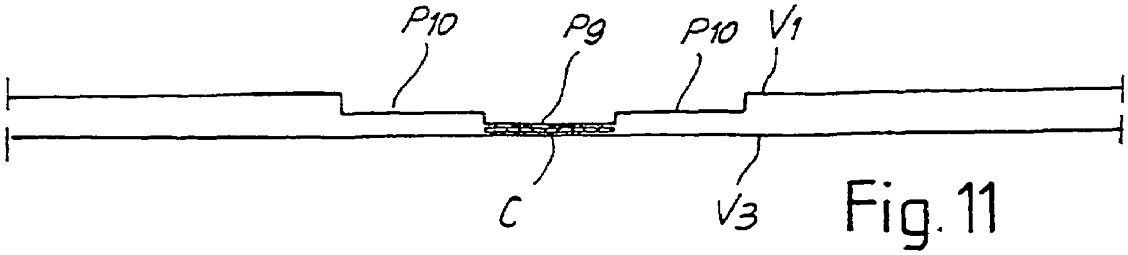
FIG. 11 shows a schematized and enlarged local section of a product obtained with a roller provided with points produced according to FIGS. 9 and 10.

FIG. 9 shows a top view of a portion of an embossing cylinder 9 in a different embodiment. The points of the first and of the second series are again indicated with 9P and 10P respectively. In this case, nonetheless, the points 9P and 10P are joined to each other and form a single protrusion, with a front surface constituted by portions at different heights, as can be seen in the section of FIG. 10. FIG. 11 shows a local schematic section of the material embossed with a device of the type illustrated in FIG. 6, where the embossing unit 1, 3 is omitted or not operating, and the cylinder 9 is produced with protrusions as shown in FIGS. 9 and 10. References P9 and P10 indicate the two series of protuberances of different height produced on the ply V1 and C indicates the adhesive which joins the ply V1 to the ply V3.

FIG. 12 shows a local section of a portion of an embossing cylinder 9 in a further embodiment. In this case the cylinder 9 has a first series of points 9P of greater height and a second series of points of lesser height 10P. The two series of points 9P and 10P form the decorative pattern on the embossed ply. The points of lesser height which form background micro-embossing of the ply V1 are indicated with 11P. FIG. 14 shows a local section of the product obtained with a cylinder of this type, which may replace the cylinder 9 in FIG. 6, eliminating the embossing unit 1, 3. In this case the ply V1 is embossed with the cylinder 9 alone. Moreover, as can be seen in FIG. 13, the protuberances P9 of greater height are distributed around the protuberances P10 according to a pitch corresponding to the protuberances P11 produced by the points 11P and form with said protuberances P10 the complex decorative pattern.

In all the embodiments, the background embossing surrounding the complex decorative patterns may be omitted, as may embossing of the second ply V3 be omitted.

It is to be understood that the drawing shows only a possible embodiment of the invention, which may vary in its forms and layouts, without however departing from the scope of the concept underlying the invention. The presence of any reference numerals in the attached claims has the sole purpose of facilitating reading in the light of the preceding description and the attached drawings and does not limit the scope of protection thereof.

The invention claimed is:

1. A method for producing an embossed web product comprising bonding at least two plies to one another, wherein:

at least a first ply of said at least two plies is embossed producing on said first ply a first series of protuberances and a second series of protuberances, the protuberances of the first series being of greater height than the protuberances of the second series;

an adhesive is applied to the first series of protuberances;

said first ply is adhesively bonded to a second ply of said at least two plies, protuberances of the first ply projecting inside the web product towards the second ply;

the first series of protuberances and the second series of protuberances form in combination with each other complex decorative patterns, each complex decorative pattern being formed by a combination of at least one protuberance of the first series and at least one protuberance of the second series, said at least one protuberance of the first series and said at least one protuberance of said second series being joined to form a single complex protrusion having portions of different heights;

each said complex protrusion being distributed to provide a density of complex protrusions equal to or less than 2 patterns per $cm^2$; and said second series of protuberances being substantially free of adhesive.

2. The method as claimed in claim 1, wherein said adhesive is colored and provides said complex decorative patterns with a chromatic effect.

3. The method as claimed in claim 1, wherein a background pattern is applied to said first ply.

4. The method as claimed in claim 3, wherein said background pattern applied to the first ply comprises embossing constituted by a distribution of protuberances of smaller size and greater density than protuberances forming the complex decorative pattern.

5. The method as claimed in claim 4, wherein protuberances forming the background pattern applied to the first ply are of lesser height than the protuberances of the first series.

6. The method as claimed in claim 4, wherein said background pattern is applied to said first ply in a single embossing operation simultaneously to embossing said first series of protuberances and said second series of protuberances.

7. The method as claimed in claim 1, wherein a background pattern is applied to said second ply.

8. The method as claimed in claim 7, wherein said background pattern applied to the second ply comprises embossing constituted by a distribution of protuberances of smaller size and greater density than protuberances forming the complex decorative pattern.

9. The method as claimed in claim 8, wherein said protuberances forming the background pattern of the second ply are of lesser height than the protuberances of said first series.

10. The method as claimed in claim 1, wherein each said complex protrusion is distributed to provide a density of complex protrusions ranging from 400 to 20000 patterns per $m^2$.

11. The method as claimed in claim 1, wherein said protuberances of the first series occupy a percentage ranging from 0.3 to 10% of total surface of the web product.

12. The method as claimed in claim 1, wherein said complex decorative patterns occupy a percentage ranging from 1 to 25% of total surface of the web product.

13. A sheet product comprising:

a first ply embossed with a first series of protuberances and a second series of protuberances, the protuberances of the first series being of greater height than the protuberances of the second series;

a second ply adhesively bonded to said first ply by an adhesive on extremities of the first series of protuberances, said first series of protuberances facing towards the second ply;

wherein the first series of protuberances and the second series of protuberances form in combination with each other complex decorative patterns, each of said complex decorative patterns being formed by a combination of at least one protuberance of the first series and at least one protuberance of the second series in contact with one another to form a complex protrusion; each said complex protrusion being distributed to provide a density of complex protrusions equal to or less than 2 patterns per $cm^2$; and said second series of protuberances being substantially free of adhesive.

14. The product as claimed in claim 13, wherein said adhesive is colored and provides said complex decorative patterns with a chromatic effect.

15. The product as claimed in claim 13, wherein said first ply has a background pattern.

16. The product as claimed in claim 15, wherein said background pattern comprises an embossing constituted by a distribution of protuberances of smaller size and greater density than protuberances forming the complex decorative pattern.

17. The product as claimed in claim 16, wherein protuberances forming the background pattern of the first ply are of lesser height than the first series of protuberances.

18. The product as claimed in claim 13, wherein said second ply has a background pattern.

19. The product as claimed in claim 18, wherein said background pattern of the second ply comprises an embossing constituted by a distribution of protuberances of smaller size and greater density than protuberances forming the complex decorative pattern.

20. The product as claimed in claim 19, wherein said protuberances forming the background pattern of the second ply are of lesser height than the protuberances of the first series.

21. The product as claimed in claim 13, wherein said complex decorative patterns are distributed at a density ranging from 400 to 20000 patterns per $m^2$.

22. The product as claimed in claim 13, wherein said protuberances of the first series occupy a percentage ranging from 0.3 to 10% of total surface of the web product.

23. The product as claimed in claim 13, wherein said complex decorative patterns occupy a percentage ranging from 1 to 25% of total surface of the web product.

24. A device for producing an embossed web material, comprising at least one embossing cylinder, a pressure roller cooperating with said embossing cylinder, and an adhesive applicator unit; said embossing cylinder being provided with a first series of protruding points and with a second series of protruding points, the first series of protruding points being of greater height than the second series of protruding points, wherein the first series of protruding points and the second series of protruding points form in combination with each other complex protrusions to form complex decorative patterns on at least one ply destined to form said web material, each of said complex protrusions being formed by at least one point of the first series of protruding points in contact with at least one point of the second series of protruding points, and wherein said complex protrusions are distributed at a density equal to or less than 2 protrusions per $cm^2$, said adhesive applicator being arranged to apply adhesive on said first series of protruding points but not on the second series of protruding points.

25. The device as claimed in claim 24, further comprising an arrangement to produce background embossing on said web material.

26. The device as claimed in claim 25, wherein said arrangement to produce said background embossing comprises an auxiliary embossing unit.

27. The device as claimed in claim 25, wherein said arrangement to produce said background embossing comprises a third series of protruding points on said embossing cylinder.

28. A method for producing an embossed web product comprising bonding at least two plies to one another, wherein a background pattern is applied to at least a first ply;

at least the first ply of said at least two plies is embossed producing on said first ply a first series of protuberances of greater height than said background pattern;

an adhesive is applied to the first series of protuberances;

said first ply is adhesively bonded to a second ply of said at least two plies, protuberances of the first ply projecting inside the web product towards the second ply;

at least a second series of protuberances is produced by embossing on said first ply, said protuberances of said first series being greater in height than the protuberances of the second series;

the first series of protuberances and the second series of protuberances form in combination with each other complex decorative patterns, each complex decorative pattern being formed by a combination of at least one protuberance of the first series and at least one protuberance of the second series;

said complex decorative patterns are distributed at a density equal to or less than 2 patterns per $cm^2$; and said second series of protuberances are substantially free of adhesive.

29. The method as claimed in claim 28, wherein said adhesive is colored and provides said complex decorative patterns with a chromatic effect.

30. A sheet product comprising:

a first ply embossed with a first series of protuberances and a second series of protuberances, the protuberances of the first series being of greater height than the protuberances of the second series;

a second ply adhesively bonded to said first ply by an adhesive on surfaces of the first series of protuberances, said first series of protuberances facing towards the second ply and the second series of protuberances being substantially free of adhesive;

wherein the first series of protuberances and the second series of protuberances form in combination with each other complex decorative patterns, each complex decorative pattern being formed by a combination of at least one protuberance of the first series and at least one protuberance of the second series, said at least one protuberance of the first series and said at least one protuberance of said second series being joined to one another to form a single complex protrusion having portions of different heights; each said complex protrusion being distributed to provide a density of complex protrusions equal to or less than 2 patterns per $cm^2$.

31. A sheet product comprising:

a first ply having a background pattern and a first series of protuberances and a second series of protuberances, the protuberances of the first series being of greater height than the protuberances of the second series;

a second ply adhesively bonded to said first ply by an adhesive applied to surfaces of the first series of protuberances, said first series of protuberances facing towards the second ply, said second series of protuberances being substantially free of adhesive;

wherein the protuberances of the first series and of the second series form in combination with each other complex decorative patterns, each complex decorative pattern being formed by a combination of at least one protuberance of the first series and at least one protuberance of the second series, said combination forming a complex protrusion; each complex protrusion being distributed to provide a density of complex protrusions equal to or less than 2 patterns per $cm^2$.

* * * * *